(12) United States Patent
Okada et al.

(10) Patent No.: US 7,586,680 B2
(45) Date of Patent: Sep. 8, 2009

(54) PROJECTION SCREEN HAVING A PLURAL NUMBER OF LIGHT CONTROL LAYERS

(75) Inventors: Toyokazu Okada, Yokohama (JP); Seiji Muro, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/091,331

(22) Filed: Mar. 29, 2005

(65) Prior Publication Data

US 2005/0219692 A1  Oct. 6, 2005

(30) Foreign Application Priority Data

Mar. 31, 2004  (JP) .............................. 2004-103181
Aug. 20, 2004  (JP) .............................. 2004-240581

(51) Int. Cl.
G03B 21/60 (2006.01)
G03B 21/56 (2006.01)

(52) U.S. Cl. .................. 359/454; 359/453; 359/460

(58) Field of Classification Search ................ 359/443, 359/452–457, 459–460
See application file for complete search history.

(56) References Cited

U.S. PATENT DOCUMENTS

| | | | |
|---|---|---|---|
| 4,929,523 A * | 5/1990 | Kitayama et al. ............... | 430/4 |
| 5,040,870 A | 8/1991 | Ohno et al. | |
| 5,108,857 A | 4/1992 | Kitayama et al. | |
| 5,137,801 A | 8/1992 | Tsujino et al. | |
| 5,767,935 A | 6/1998 | Ueda et al. | |
| 5,841,572 A * | 11/1998 | Ando et al. ............... | 359/454 |
| 6,424,395 B1 * | 7/2002 | Sato et al. ............... | 349/112 |
| 2003/0174396 A1 * | 9/2003 | Murayama et al. ............ | 359/453 |
| 2004/0160669 A1 * | 8/2004 | Osawa et al. ................ | 359/460 |

FOREIGN PATENT DOCUMENTS

| | | |
|---|---|---|
| EP | 0 272 582 A2 | 6/1988 |
| EP | 0 422 620 A2 | 4/1991 |
| JP | 63-309902 A | 12/1988 |
| JP | 64-77001 A | 3/1989 |
| JP | 3-107901 A | 5/1991 |
| JP | 3-200949 A | 9/1991 |
| JP | 4-77727 A | 3/1992 |
| JP | 4-77728 A | 3/1992 |
| JP | 7-58361 A | 3/1995 |
| JP | 2691543 B2 | 9/1997 |
| JP | 2702521 B2 | 10/1997 |
| JP | 2782200 B2 | 5/1998 |
| JP | 2782250 B2 | 5/1998 |
| JP | 2822065 B2 | 9/1998 |
| JP | 3211381 B2 | 7/2001 |
| JP | 2004-69836 A | 3/2004 |

* cited by examiner

*Primary Examiner*—Diane I Lee
*Assistant Examiner*—Magda Cruz
(74) *Attorney, Agent, or Firm*—Sughrue Mion, PLLC

(57) ABSTRACT

A projection screen using light control layers having high light diffusion and further providing an image with high image quality over a wide angle range without deteriorating light transmittance is provided. A plural number of light control layers in which a haze value of the layer is dependent on an angle and a light scattering angle region showing a haze value of 60% or more is in the range of 30° or more when light is injected on the surface of the layer at an angle of 0 to 180° are laminated to obtain a screen.

7 Claims, 6 Drawing Sheets

Measurement method of dependency of turbidity value on angle

PROJECTION SCREEN HAVING A PLURAL NUMBER OF LIGHT CONTROL LAYERS

BACKGROUND OF THE INVENTION

1. Field of the Invention

The invention relates to a projection screen.

2. Description of the Related Art

A projection display is also called as rear-projection display and its example is illustrated in FIG. 1. As shown in the FIG. 1, the projection display 1 injects light from a light source unit 3 on a mirror 6 through an image display unit 4 and then projection lens 5, and the light coming through the image display and the projection lens is reflected on the mirror to project an image on a screen 7 from a rear face. A liquid crystal panel, a cathode ray tube (CRT) and the like are used for the image display unit 4. Further, there is also a system of directly projecting an image from the image display unit on a screen.

A combination of Fresnel lenses and lenticular lenses is usually used for the screen 7 of such projection display. The Fresnel lenses have a function of converting light from a light source or a mirror to parallel light and injecting light nearly vertical to the lenticular lenses. On the other hand, the lenticular lenses have a function of controlling and scattering light injected from the Fresnel lenses.

As the material of the Fresnel lenses and lenticular lenses for the projection screen, transparent thermoplastic resins such as an acryl resin, a polystyrene resin, a polyvinyl chloride resin and a polycarbonate resin can be used. Among these, the acryl resin is preferably used in view of its transparency, hardness, durability, processing suitability and the like. Further, those to which light diffusion was imparted by mixing light diffusion materials such as silica, alumina, clay, glass and beads to the above-mentioned thermoplastic resin are widely used for the lenticular lenses.

Both of light diffusion performance and light transmission performance are important in the projection screen. Although a conventional projection screen is superior in light diffusion, total light transmittance is low; therefore a screen becomes dark. When the total light transmittance is increased for making the image projected on a screen bright, the light diffusion and the resolution of the image on a screen is lowered; therefore it has been desired to simultaneously satisfy both of light diffusion performance and light transmission performance. Further, a conventional projection screen has had moiré patterns caused by the pitches of the Fresnel lenses and lenticular lenses are often appeared on a screen. Further, since an angle range providing an image with a high level visibility was narrow, a conventional screen was not satisfactory as a screen used for a large-sized television with a high-level image quality.

In order to improve above, several methods by which a light control film having the dependency of haze value on an angle is applied to the projection screen are proposed. For example, it is described in Japanese Patent No. 2838295 that a light control film having the dependency of haze value on an angle which was obtained by curing a composition having at least two kinds of optically polymerizable monomers or oligomers which have different refractive indices by irradiating light from two directions or more is used as the projection screen. Further, it is described in Japanese Patent Publication No. H4-77728 A that a plural number of light control films having the dependency of haze value on an angle which were obtained by curing a composition having at least two kinds of optically polymerizable monomers or oligomers which have different refractive indices by irradiating light are laminated and are used as the projection screen.

When the light control films proposed by these literatures are used to the projection screen, a bright image on the screen can be obtained while keeping total light high transmittance. However, such screen dose not necessarily satisfy the desire that an image with a high level quality is provided over a wide angle range as a large-sized television.

Further, a method of preparing a light control film having the dependency of haze value on an angle which was obtained by forming a film from a composition having at least two kinds of optically polymerizable monomers or oligomers which have different refractive indices and curing it by irradiating light from a specific direction on it, and a composition thereof are described, for example, in Japanese Patent Publication No. H07-58361 B; Japanese Patent No. 2691543, No. 2702521, No. 2782200, No. 2782250, No. 2822065, No. 3211381 and the like.

SUMMARY OF THE INVENTION

The present inventor has intensively studied a screen combining the Fresnel lenses and lenticular lenses and a screen using the light control film proposed in the above-mentioned Japanese Patent No. 2838295 and Japanese Patent Publication No. H04-77728 A, and as a result, has achieved the present invention. Consequently, the present invention is to provide a projection screen using light control films having high light diffusion and further providing an image superior in image quality over a wide angle range without deteriorating light transmittance (total light transmittance).

According to the present invention, a projection screen comprising a plural number of light control layers in which a haze value of the layer is dependent on an angle and a light scattering angle region showing the haze value of 60% or more is in the range of 30° or more when light is injected on the surface of the layer at an angle of from 0 to 180° is provided.

The light control layer is preferably a layer cured by irradiating light on a composition comprising at least two kinds of optically polymerizable monomers or oligomers which have different refractive indices. At least two of plural number of the light control layers are preferably laminated so that the directions of the light scattering angle regions of the two layers are nearly orthogonal. Further, at least two of a plural number of the light control layers are preferably also laminated so that the directions of the light scattering angle regions of the two layers are nearly parallel, the respective light scattering angle region is inclined from the each normal line, and the inclination direction of the light scattering angle regions is opposite with each other to the normal line. When the two light control layers are laminated so that the directions of the light scattering angle regions are nearly parallel as the latter, it is preferable that the light scattering angle regions of them are mutually brought in contact, or the portions of the light scattering angle regions are mutually overlapped. When the two light control layers are laminated so that the directions of the light scattering angle regions are nearly parallel, it is preferable that at least another one layer is laminated so that the direction of the light scattering angle region is nearly orthogonal to the preceding two light control layers which were arranged in nearly parallel.

In the present invention, when "nearly" of a term of "nearly orthogonal" or "nearly parallel" means that about ±10° inclined from orthogonal or parallel is within the scope of the present invention.

Since the projection screen of the present invention can keep total light transmittance at a high value and a plural number of light control layers in which the light scattering angle regions were controlled are laminated, it is better in comparison with the screen proposed in the fore-mentioned Japanese Patent No. 2838295 and Japanese Patent Publication No. H04-77728 A and light diffusion at a wide angle range is revealed. Consequently, a bright image can be further obtained at a wide view angle, moiré patterns are not appeared, and an image superior in image quality can be obtained.

DESCRIPTION OF THE PREFERRED EMBODIMENT

The present invention is illustrated below. In the present invention, a plural number of light control layers in which a haze value is dependent on an angle and a light scattering angle region showing the haze value of 60% or more is shown over an angle range of 30° or more, namely, light control layers having the wide light scattering angle region are laminated to obtain the projection screen. The haze value mentioned here is a value obtained by measuring the total light transmittance and diffuse transmittance of a light control layer using an integrating sphere light transmittance measuring instrument (for example, a Haze meter HGM-20P type measurement instrument manufactured by Suga Test Instrument Co., Ltd.) according to JIS K 7105 and determined by the formula below.

$$\text{Haze value (\%)} = 100 \times \frac{\text{Diffuse trasmittance (\%)}}{\text{Total light transmittance (\%)}}$$

Diffuse transmittance=total light transmittance−parallel light transmittance

Figure 1:
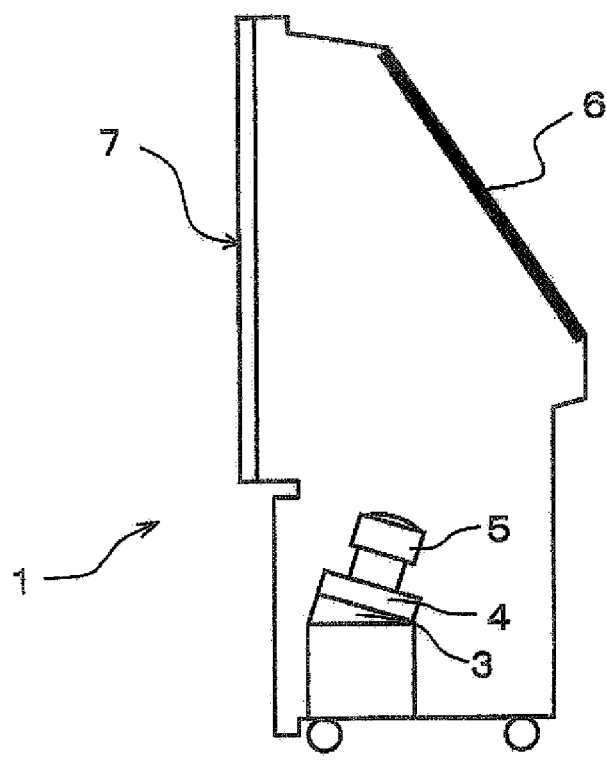
FIG. 1 is a vertical section view schematically showing the example of a projection display.
Figure 2:
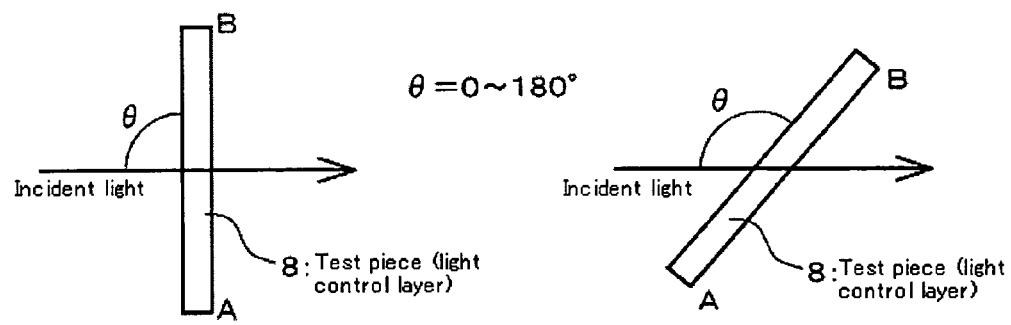
FIG. 2 is a view for illustrating the measurement method of the dependency of haze value on an angle.

Further, the dependency of haze value on an angle in the light control layer is measured as follow. As shown in FIG. 2, the angle θ of incident light to the test piece 8 of the light control film is varied between 0° and 180°, the above-mentioned haze value is measured by every respective angle and an angle range of 60% or more of haze value is referred to as the light scattering angle region. The angle θ is a value in which a direction parallel to the face of the test piece 8 is referred to as 0° and the normal line direction of the test piece 8 is referred to as 90°. The rotation of the test piece 8 is headed for a direction to which the dependency of haze value on an angle becomes the maximum. A and B in the drawing are such codes that A and B of the test piece 8 at the left drawing (in case of injecting light on the test piece 8 from a vertical direction: θ=90°) is identified as the corresponding points at the right drawing (in case of injecting light on the test piece 8 from an oblique direction).

In the present invention, the light control layers whose light scattering angle region showing a haze value of 60% or more thus obtained is 30° or more are used. The light control layers having the light scattering angle region of 40° or more are preferably used and in particular, the light control layers having the light scattering angle region of 45° or more are used. If the light scattering angle region is too large, an angle of visibility is broadened, however, in view of brightness of front face, it is usually within 100°.

For example, as described in the a fore-mentioned Japanese Patent Publication No. H07-58361 B; Japanese Patent No. 2691543, No. 2702521, No. 2782200, No. 2782250, No. 2822065, No. 3211381, the light control layer can be produced by forming a film from a composition containing at least two kinds of optically polymerizable monomers or oligomers which have different refractive indices, irradiating light on it from a specified direction and curing it. The optically polymerizable monomers or oligomers which are used for the production of the light control film are compounds having at least one polymerizable group such as an acryloyl group ($CH_2$=CHCO—), a methacryloyl group ($CH_2$=C($CH_3$)CO—), a vinyl group ($CH_2$=CH—) and an allyl group ($CH_2$=CHCH_2$—) in a molecule.

The example of the monomer includes tetrahydrofurfuryl acrylate, ethylcarbitol acrylate, dicyclopentenyloxyethyl acrylate, phenylcarbitol acrylate, nonylphenoxyethyl acrylate, 2-hydroxy-3-phenoxypropyl acrylate, ω-hydroxyhexanoylethyl acrylate, acryloyloxyethyl succinate, acryloyloxyethyl phthalate, tribromophenoxyethyl acrylate, isobornyl acrylate, 2-ethylhexyl acrylate, lauryl acrylate, 2,2,3,3-tetrafluoropropyl acrylate, methacrylates corresponding to these acrylates, and further, N-vinyl pyrrolidone, triallyl isocyanurate, diethyleneglycol diallyl carbonate, diallylidene pentaerythrytol and the like.

Further, the example of the oligomers includes poly-functional acrylates such as a polyester acrylate, a polyol polyacrylate, a modified polyol polyacrylate, a polyacrylate of a compound having isocyanuric acid skeleton, a melamine acrylate, a polyacrylate of a compound having hydantoin skeleton, a polybutadiene acrylate, an epoxy acrylate and a urethane acrylate; methacrylates corresponding to these acrylates, and the like.

These optically polymerizable monomers or oligomers are used as a composition containing a mixture of at least two kinds of the monomers or oligomers, in which refractive indices are different. A region scattering light, namely, the light scattering angle region is formed by irradiating light on a composition containing at least two kinds of optically polymerizable monomers or oligomers which have different refractive indices, from a specific direction and curing it. The composition provides the dependency of haze value on an angle resulting from the difference of the compatibility of a plural number of polymerizable monomers or oligomers from each other and respective refractive indices after curing. Accordingly, when a combination with poor compatibility of at least two kind of polymerizable monomers or oligomers having the large difference of the refractive indices and reaction rates from each other is selected, the level of scattering light, namely, the dependency of haze value on an angle is enlarged. The difference of the refractive indices is preferably 0.01 or more and in particular, 0.04 or more is preferable.

A photo polymerization initiator is usually mixed with the composition for improving curing property to be provided for photo polymerization. The example of the photo polymerization initiator includes benzophenone, benzyl, Michler's ketone, 2-chlorothioxanthone, 2,4-diethylthioxanthone, benzoin methyl ether, benzoin ethyl ether, diethoxy acetophenone, benzyl dimethylketal, 2-hydroxy-2-methylpropiophenone, 1-hydroxycyclohexyl phenyl ketone and the like.

The composition containing at least two kinds of optically polymerizable monomers or oligomers which have different refractive indices is coated on a substrate, or sealed in a cell to be a membrane shape, and the membrane is cured gradually while irradiating light with a rod shape light source to obtain the light control layer in which incident light is scattered at a selective angle region and transmitted straightly at other angle region. Light used for curing may have any wavelength so far as it cures the composition, and for example, visible light, ultraviolet rays and the like are often used. Ultraviolet rays are emitted from a mercury lamp, a metal halide lamp and the like, but when a rod shape lamp is used, the optically cured film prepared exerts anisotropy against the long axis and the short axis of a light source by adjusting irradiation condition, and comes to scatter light with a specific angle only when it is rotated setting the long axis of the light source as an axis.

Namely, the optically cured layer prepared forms a layer structure of diffraction lattice shape to a specific direction caused by the phase separation in a resin having different refractive indices. It is considered that light injected from a specific angle is scattered by the principle according to the Bragg's diffraction condition. The degree of scattering and the angle of incident light selectively scattered can be adjusted by the composition used and irradiation condition, and in particular, an angle region of a layer in which light injected to the cured layer is scattered or straightly transmitted can be controlled by varying an incident angle of the incident light against the composition surface.

The light scattering angle region emerges around the irradiation direction of light at optical curing. For example, when light is irradiated nearly perpendicular to the layer surface formed from the optically curing resin composition, the light scattering angle region emerges around said perpendicular direction, namely the normal line direction, and when light is irradiated from an oblique direction which is inclined at a fixed angle against the normal line direction, the light scattering angle region emerges around the inclined direction.

Figure 3:
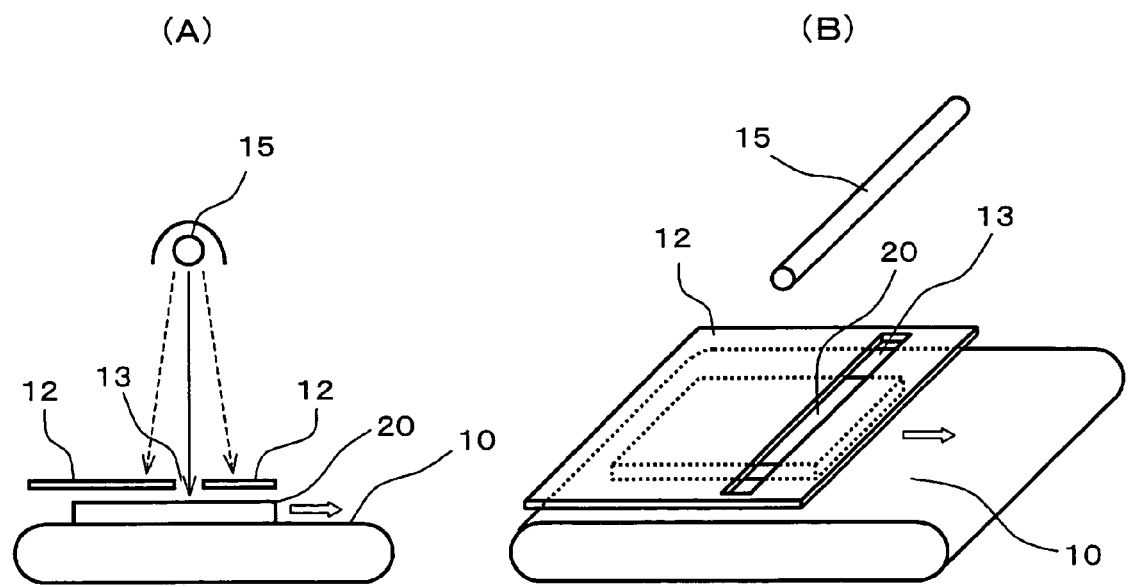
FIG. 3 is a side view (A) and a perspective view (B) showing the example of an instrument when light is irradiated from a perpendicular direction on the optically curing resin composition coating layer.

An example of a case of irradiating light on the optically curing resin composition from a perpendicular direction is illustrated by FIG. 3. FIG. 3(A) is a side view schematically showing one example of an instrument which can be adopted when light is irradiated from a perpendicular direction on the optically curing resin composition layer, and FIG. 3(B) is a perspective view of the instrument. The instrument is composed of a conveyer 10 which moves to a white arrow direction, a light shielding plate 12 arranged over the conveyer 10 in which a slit 13 was formed over the width direction of the conveyer, and a rod shape light source lamp 15 which was arranged at a fixed interval over the plate. The slit 13 is formed so as to coincide with the length direction of the light source lamp 15. Further, a substrate 20 on which the optically curing resin composition layer was formed is mounted on the conveyer 10, and when light from the light source lamp 15 is irradiated on the optically curing resin composition layer through the slit 13 of the light shielding plate 12 while moving it at a constant speed, light to a perpendicular direction is dominatingly irradiated on the composition layer; therefore phases whose refractive indices are different from each other to the perpendicular direction (normal line direction) are alternately formed and the light diffusion angle region emerges around the direction. The angle range at which the haze value is enlarged, namely, the size of the light diffusion angle region can be controlled by controlling the width of the slit 13, a distance from the rod shape light source lamp 15 to the optically curing resin layer, the thickness of the optically curing resin composition, irradiated light dose, the wavelength of irradiated light and the like.

Figure 4:
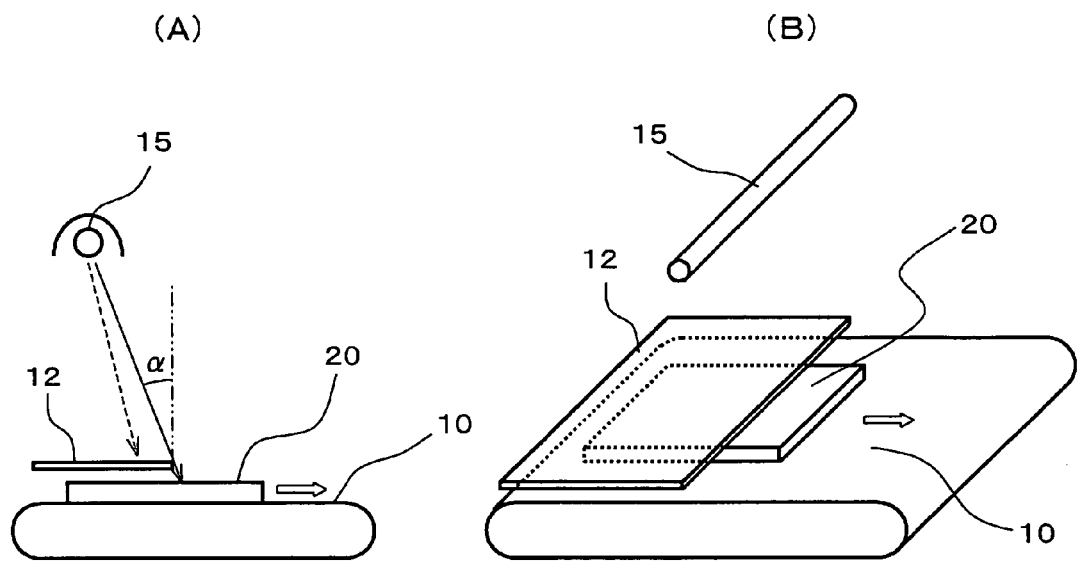
FIG. 4 is a side view (A) and a perspective view (B) showing the example of an instrument when light is irradiated from an oblique direction on the optically curing resin composition coating layer.

Then, an example of a case irradiating light on the optically curing resin composition layer from an oblique direction is illustrated by FIG. 4. FIG. 4(A) is a side view schematically showing one example of an instrument which can be adopted when light is irradiated from an oblique direction on the optically curing resin composition layer, and FIG. 4(B) is a perspective view of the instrument. The instrument is composed of a conveyer 10 which moves to a white arrow direction, a light shielding plate 12 which covers a fixed position over it, and a rod shape light source lamp 15 which was arranged at a fixed interval over the plate. The terminal portion of the light shielding plate 12 in the example is protruded little to the proceeding direction of the conveyer 10 from just under the light source lamp 15. Further, the substrate 20 on which the optically curing resin composition layer was formed is mounted on the conveyer 10, and when light from the light source lamp 15 is irradiated on the light shielding plate 12 side while moving it at a constant speed, light having a fixed angle $\alpha$ is dominatingly irradiated on the composition layer; therefore phases whose refractive indices are different to the injection direction of light are alternately formed and the light scattering angle region emerges around the direction. The central value of the light diffusion angle region can be changed by changing the light irradiation angle $\alpha$, and the angle range at which the haze value is enlarged, namely, the size of the light scattering angle region can be controlled by controlling a distance from the light source lamp 15 to the optically curing resin layer, the thickness of the optically curing resin composition layer, irradiated light dose, the wavelength of irradiated light and the like.

In the present invention, the light control layers which are obtained by the method described above and in which the light scattering angle region showing a haze value of 60% or more is 30° or more are laminated in plurality to prepare the projection screen. Specifically, two layers among a plural number of the light control layers are laminated so that the respective directions of the light scattering angle regions are nearly orthogonal, or two layers among a plural number of the light control layers are laminated so that the light scattering angle regions are inclined against the normal line direction, the directions of the light scattering angle regions of the two layers are nearly parallel and the light scattering angle regions at laminated condition are broadened than one layer. In the latter case, more specifically, the respective light scattering angle regions of the two light control layers shall be laminated so as to be plane symmetry to the parallel plane including normal line to the direction of the light scattering angle region.

As the method of laminating two layers or more of the light control layers, the light control layers separately prepared may be pasted through a medium such as an adhesive, or may be overlapped without intervention of the medium. Further, the light control layers may be also laminated by coating the optically curing resin composition on the light control layer previously prepared, as a substrate and curing it to form the another light control layer.

Figure 5:
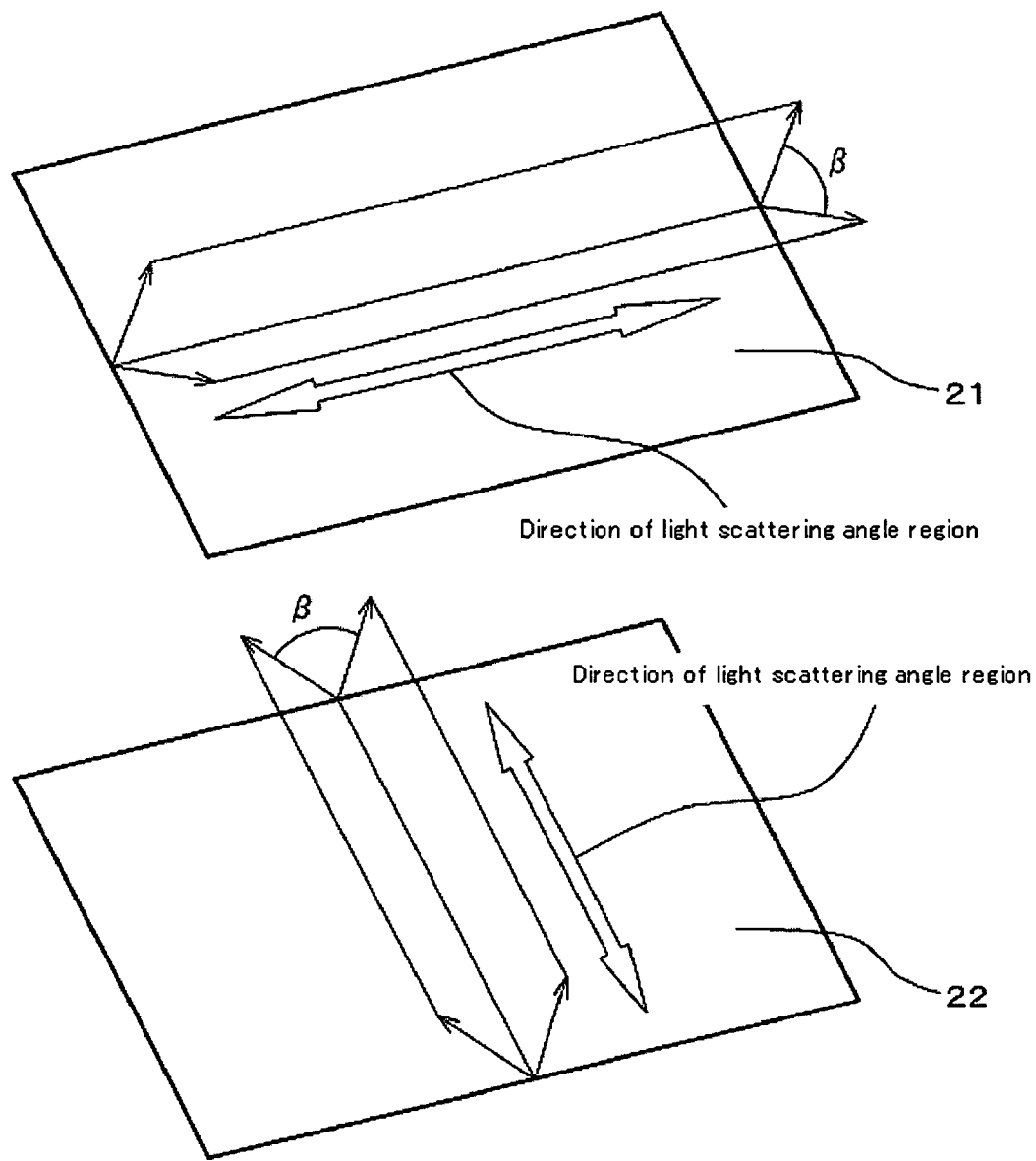
FIG. 5 is a a perspective view schematically showing a case of laminating two layers of the light control layer so that the directions of the respective light scattering angle regions are nearly orthogonal.

An example where the two light control layers are laminated so that the directions of the respective light scattering angle regions are nearly orthogonal is illustrated based by FIG. 5. FIG. 5 is a perspective view schematically illustrating a case of laminating the two light control layers so that the directions of the respective light scattering angle regions are nearly orthogonal. In the example, the first light control layer 21 is the haze value of 60% or more at the range of an angle $\beta$ around a long side direction as a rotational axis. On the other hand, the second light control layer 22 is the haze value of 60% or more at the range of an angle $\beta$ around a short side direction as a rotational axis. These angles $\beta$ correspond to the light scattering angle regions. Further, the direction to which the light scattering angle region is extended is referred to as "the direction of the light scattering angle region". In the condition shown in FIG. 5, when the two light control layers 21 and 22 are laminated so that the respective mutual long sides and the respective mutual short sides coincide, the directions of the light scattering angle regions of these two films become a nearly orthogonal.

Thus, the projection screen which displays an image with a wide angle of visibility to a left and right direction and an up and down direction can be prepared by laminating two layers of the light scattering angle regions so that the directions of the respective light scattering angle regions are nearly orthogonal.

Figure 6:
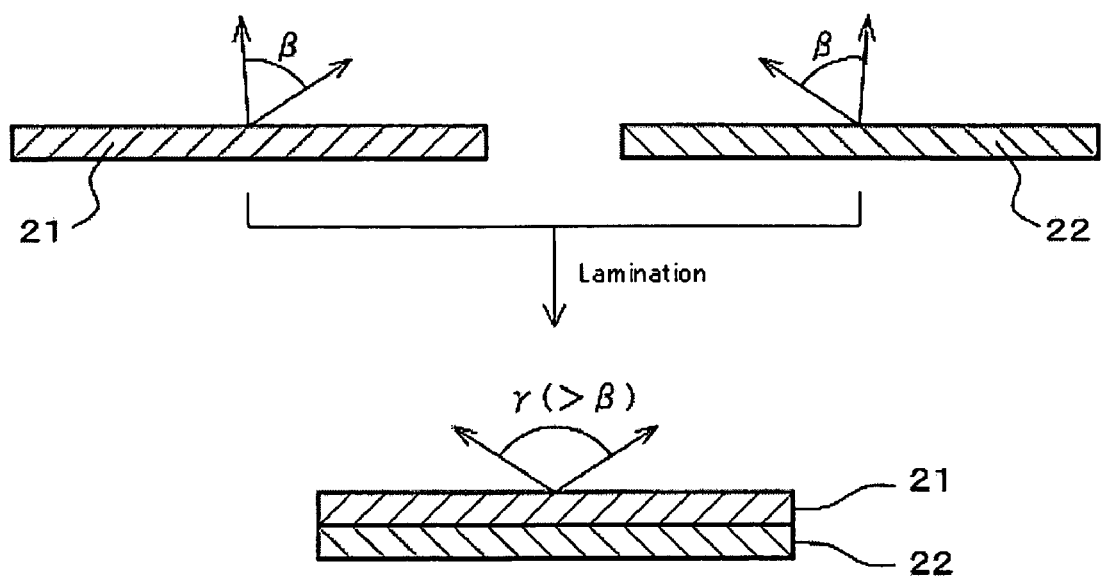
FIG. 6 is a vertical sectional view schematically showing a case of laminating two layer of the light control layer in which the light scattering angle region was inclined against the normal line so that the directions of the respective light scattering angle regions are nearly parallel and the respective light scattering angle regions are plane symmetry to the parallel plain including the normal line to the direction of the light scattering angle region.

Then, an example where the two light control layers are laminated so that the directions of the respective light scattering angle regions are nearly the same is illustrated by FIG. 6. FIG. 6 is a vertical section view schematically illustrating a case of laminating the two light control layers whose light scattering angle regions are inclined from the normal line, and the directions of the respective light scattering angle regions are nearly parallel and the inclination direction of the light scattering angle regions is opposite with each other to the normal line. In the example, the first light control layer 21 has the haze value of 60% or more at the range of an angle $\beta$ to a direction slightly inclined to the right side from the normal line. On the other hand, the second light control layer 22 has the haze value of 60% or more at the range of an angle $\beta$ to a direction slightly inclined to the left side from the normal line. The second light control layer 22 correspond to a condition in which the direction of the first light control layer 21 is reversed (in the drawing, a condition in which left and right are reversed). When these two light control layers 21 and 22 are laminated to the direction as they are, they have the haze value of 60% or more at the range of a wider angle $\gamma$ than the respective light scattering angle regions $\beta$, as shown under the drawing.

The light scattering angle region of the first light control layers 21 and that of the second light control layers 22 may or may not overlapped. A bright image at the surface of a screen may be obtained by laminating the first and second light control layers so that two of the light scattering angle regions are just brought in contact, or by laminating them so that the portions of them are mutually overlapped (FIG. 6). Thus, when they are laminated so that the two light scattering angle regions are brought in contact or the portions of them are mutually overlapped, the contact portions or the overlapped portions appear nearby the normal line. When the two light scattering angle regions of the first light control layer 21 and the second light control layer 22 are laminated so as to be just brought in contact, it is advantageous that good visibility regions to left and right and up and down directions, namely, the angle of visibility can be broadened. On the other hand, when the light scattering angle regions of the first light control layer 21 and the second light control layer 22 are laminated so as to be partially overlapped, it is advantageous that a brighter image at the surface of a screen can be obtained.

When the two light scattering angle regions are laminated so as to be partially overlapped, the overlapped angle is preferably 5° or more. On the other hand, when the angle at which the two light scattering angle regions are overlapped is too enlarged, an effect of improving the angle of visibility may be small; therefore, depending on the width of the light scattering angle regions in the light control layer that the non-overlapped regions of the light scattering angle regions exist in total at 40° or more and further 50° or more.

The examples of laminating the two light control layers were illustrated in FIGS. 5 and 6, and three or more layers can be also laminated in the same way. For example, when the third more light control layers is laminated in a condition in which two light control layers have been laminated so that the directions of the respective light scattering angle regions of the two light control layers are nearly orthogonal as shown in FIG. 5, the third or more of light control layer are laminated so that the direction of the light scattering angle region is nearly the same as the direction of the light scattering angle region of either of the first light control layer 21 or the second light control layer 22, or the direction is different from either of these light scattering angle regions.

On the other hand, when another light control layer is further laminated in a condition in which two light control layer are laminated so that the directions of the respective light scattering angle regions of the two light control layers are nearly the same as is shown in FIG. 6, it is preferably arranged so that the direction of the light scattering angle region of said another control layer is nearly orthogonal to the directions of the light scattering angle regions of the first light control layer 21 and the second light control layer 22. Thus, it is further effective for broadening good visible recognition regions to left and right and up and down directions, namely, the angle of visibility that the width of the light scattering angle regions is broadened by the two light control layers and another light control layer is laminated so that the light scattering angle regions are nearly orthogonal. In this case, the two light control layers which are laminated so that the directions of the respective light scattering angle regions are nearly the same may be a condition in which both of the light scattering angle regions are just brought in contact as previously mentioned, or a condition in which both of the light scattering angle regions are partially overlapped.

Figure 7:
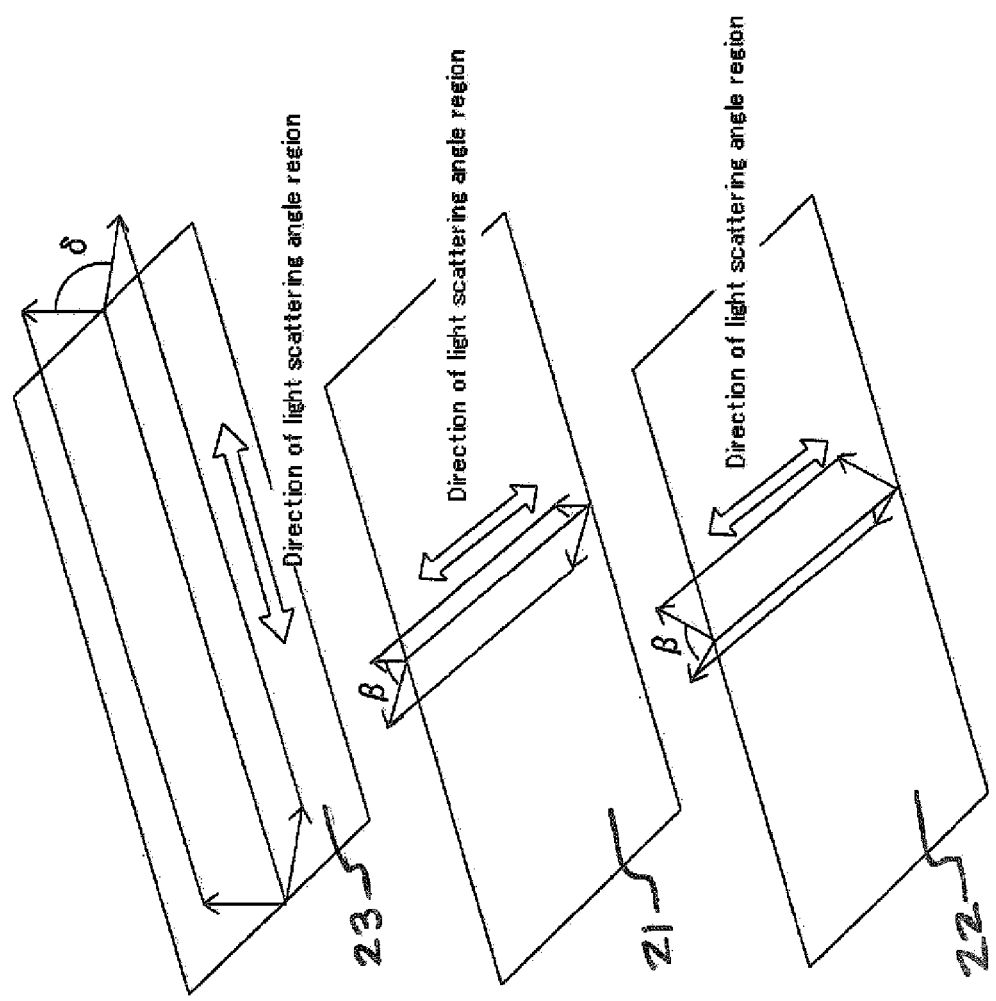
FIG. 7 is a perspective view schematically showing a non-limiting embodiment of the present invention, wherein the bottom two light control layers are laminated so that the directions of the light scattering angle regions of the two layers are nearly parallel, the respective light scattering angle region is inclined from each normal line, and the inclination direction of the light scattering angle regions is opposite with each other to the normal line, and wherein an additional layer is laminated so that the direction of the light scattering angle region is nearly orthogonal against the light scattering angle region of the bottom two light control layers.

For example, in FIG. 7, which is a perspective view schematically showing a non-limiting embodiment of the present invention, the bottom two light control layers 21 and 22 are laminated so that the directions of the light scattering angle regions of these two layers are nearly parallel, the respective light scattering angle region is inclined from each normal line, and the inclination direction of the light scattering angle region is opposite with each other to the normal line. Further, in FIG. 7 an additional layer 23 is laminated so that the direction of the light scattering angle region is nearly orthogonal against the light scattering angle regions of the bottom two light control layers 21 and 22.

Further, illustration was carried out in FIGS. 5 and 6 assuming that the two light control layers 21 and 22 are the same kind and the light scattering angle regions are also the same, but the light control layers having the different kinds and the different light scattering angle regions may be laminated in plurality. When the different kinds of the light control layers are laminated, at least two layers among them may be those in which the light scattering angle region indicating the haze value of 60% or more is 30°. However, when three or more of the layers are laminated, it is further preferable that all of them are composed of those in which the light scattering angle region indicating the haze value of 60% or more is 30° or more, in particular 40° and further, 45° or more.

The maximum incident angle by which a light axis injected from an image display unit is bent to a viewer side (namely, a direction perpendicular to a screen) can be broadened by applying a multi-layer lamination composition, and as a result, it imparts an effect that a region at which the whole screen are uniformly brilliant from a viewer side, namely high quality region can be greatly broadened. Further, when the two light control layers are laminated so that the directions of the respective light scattering angle regions are nearly orthogonal, the light of a light source is also efficiently bent to the viewer side at the top: down, left or right end portion of the screen; therefore the whole screen uniformly brilliant.

The projection screen of the present invention can be formed by pasting the light control layers on the surface of a transparent substrate such as a transparent glass or a transparent plastic, or as a laminate in which the light control layers are inserted between a plural number of substrates. It can be also used as the projection screen superior in light dispersion and having total light high transmittance by laminating the above-mentioned light control layers on a polished glass or a light dispersion plate which includes filler in a comparatively little amount in order to enhance total light transmittance by lowering light dispersion. A substrate which is used for forming the light control layers can be also used as the above-mentioned transparent or light dispersing substrate.

The light control layers may be used in the form of a plate on which a plural number of layers were laminated and the outmost layer may be lenticular lens shape. As the method of forming a lens curvature, there is a method of laminating the afore-mentioned laminate of the light control layers on a substrate having the lens curvature, and additionally, a method of forming the light control layers having the lens curvature. When the latter method is adopted, for example, a casting having the lens curvature is used, the optically curing resin composition is coated on it and light is irradiated to provide the lens curvature on the cured article.

EXAMPLES

The present invention is illustrated according to Examples below, but the present invention is not limited by these Examples. In Examples, parts representing contents or amounts used are based on weight.

Example 1

An optically curing resin composition in which 50 parts of tribromophenoxyethyl acrylate (refractive index: 1.567) and 3 parts of benzyl dimethylketal were added to 50 parts of polyether urethane acrylate (refractive index: 1.481) obtained by reaction of polypropylene glycol having an average molecular weight of about 2000, toluene diisocyanate and 2-hydroxyethyl acrylate was coated on a glass plate at a thickness of about 220 μm. A rod shape high pressure mercury lamp with 80 W/cm was fixed on a position of 120 cm over the coating layer and light was irradiated through a light shielding plate provided with a slit so that light is vertically irradiated on the whole surface of the coating layer while moving a glass plate provided with a coating layer at a speed of 1 m/minute (refer to FIG. 3) to obtain the light control layer (1). The light scattering angle region indicating the haze value of 60% or more was from 74 to 106° (region with a range of 32°). Two light control layer (1) were used, and one remains on the glass plate and the other was peeled from the glass plate and was laminated on the one layer (opposite side to the glass plate) so that the directions of the respective light scattering angle regions of the two light control layers are orthogonal, to obtain a screen.

Example 2

Operation was carried out in similar manner as Example 1, except that an interference filter which transmits selectively ultraviolet rays with a wavelength of 313 nm was provided at the irradiation plane of the high pressure mercury lamp, to obtain the light control layer (2). The light scattering angle region indicating the haze value of 60% or more was from 66 to 114° (region with a range of 48°). Two light control layer (2) were used and laminated in the same manner as Example 1 (so that the directions of the respective light scattering angle regions are orthogonal), to obtain a screen.

Example 3

Operation was carried out in similar manner as Example 2, except that the light of the high pressure mercury lamp to the coating layer of the resin composition was irradiated at an angle of 25° from the normal line of the coating layer, to obtain the light control layer (3). The light scattering angle region indicating the haze value of 60% or more was from 90 to 140° (region with a range of 50°). Two light control layer (3) were used, and one remains on the glass plate and the other was peeled from the glass plate and was laminated so that the respective light scattering angle regions are plane symmetry to the parallel plane including normal line to the direction of the light scattering angel region, to obtain the light control layer in which the light scattering angle region indicating the haze value of 60% or more was from 40 to 140° (region with a range of 100°). The light control layer (4) on the glass plate was used as a screen. At this time, it was arranged so that the direction of the light diffusion angle region was a side (horizontal) direction.

Example 4

Operation was carried out in similar manner as Example 2, except that the light of the high pressure mercury lamp to the coating layer of the resin composition was irradiated at an angle of 15° from the normal line of the coating layer, to obtain the light control layer (5). The light scattering angle region indicating the haze value of 60% or more was from 80 to 130° (region with a range of 50°). Two light control layer (5) were used, and one layer remains on the glass plate and the other was peeled from the glass plate and was laminated at the light control film side (reverse side of the glass plate) so that the respective light scattering angle regions are plane symmetry to the parallel plane including normal line to the direction of the light scattering angel region, to obtain the light control layer (6) in which the light scattering angle region indicating the haze value of 60% or more was from 50 to 130° (region with a range of 80°). The light control layer (6) on the glass plate was used as a screen. At this time, it was arranged so that the direction of the light diffusion angle region was a side (horizontal) direction.

Example 5

The light control layer (3) (one layer) was peeled from the glass plate and was laminated on the light control layer (4) (2 layers laminate) obtained in Example 3 in which the glass plate was at the reverse side so that the directions of the respective light scattering angle regions were orthogonal, to obtain a screen. At this time, it was arranged so that the direction of the light diffusion angle region of the light obtained control layers was a side (horizontal) direction.

Comparative Example 1

A screen which was a combination of lenticular lenses and Fresnel lenses was used.

Comparative Example 2

Only one of the light control layer (1) prepared in Example 1 on a glass plate was set so that the direction of the light diffusion angle region was a side (horizontal) direction, to obtain a screen.

Comparative Example 3

Operation was carried out in similar manner as Example 1, except that the coating thickness of the resin composition on a glass plate was 180 μm and the moving speed of the glass plate with a coating layer was 1.8 m/min., to obtain the light control layer (7). The light scattering angle region indicating the haze value of 60% or more was from 80 to 100° (region with a range of 20°). Two light control layer (7) were used and laminated by the same mode (so that the directions of the light scattering angle regions were orthogonal) as Example 1, to obtain a screen.

Evaluation Method and Evaluation Result

All light transmittance with respect to screens of the above-mentioned Examples 1 to 5 and Comparative Examples 1 to 3 was measured according to JIS K 7105. An image from a liquid crystal panel was reflected on respective screens, and the brightness and resolution of the image were visually judged from the frontal direction of a screen, oblique directions of 30° and 60° to the horizon (side) of the screen and an oblique direction of 30° to the perpendicularity (longitudinal) based on the criteria below. Further, the presence or absence of moiré was visually judged based on the criteria below. Evaluation result was shown in Table 1.

(Judgment Criteria of Brightness of Image and Resolution)
◉: Very good.
○: Good.
Δ: Slightly dark but image is identified.
X: Considerably dark and image is hardly identified.

(Judgment Criteria of Presence or Absence of Moiré)
○: Moire is not found.
Δ: Some moire are found.
X: Many moires are found.

TABLE 1

| Example No. | Composition of screen | Light scattering angle region of one Layer | Total light transmittance | Brightness and resolution of image | | | | Presence or absence of moire |
|---|---|---|---|---|---|---|---|---|
| | | | | Front | Horizon 30° | Horizon 60° | Perpendicularity 30° | |
| Example 1 | Layer(1)⊥Layer (1) Orthogonal | 32° | 91% | ○ | ○ | Δ | Δ | ○ |
| Example 2 | Layer(2)⊥Layer (2) Orthogonal | 48° | 90% | ○ | ○ | Δ | ○ | ○ |
| Example 3 | Layer(3)∥Layer (3) plane symmetry the plane including normal line | 50° | 91% | ○ | ○ | ○ | Δ | ○ |
| Example 4 | Layer(5)∥Layer (5) plane symmetry the plane including normal line | 50° | 91% | ◉ | ○ | ○ | Δ | ○ |
| Example 5 | Layer(4)⊥Layer (3) Orthogonal | 50° | 90% | ○ | ○ | ○ | ○ | ○ |
| Comparative Example 1 | Combination of lenticular and Fresnel lenses | — | 75% | ○-Δ | X | X | X | Δ |
| Comparative Example 2 | Layer (1) One sheet | 32° | 91% | ○ | Δ | X | X | ○ |
| Comparative Example 3 | Layer(7)⊥Layer (7) Orthogonal | 20° | 92% | ○ | X | X | X | ○ |

From Table 1, either of Example 1 in which two light control layer (1) having the light scattering angle region with a range of 32° were laminated so that the directions of the light scattering angle regions were orthogonal; Example 2 in which two light control layer (2) having the light scattering angle region with a range of 48° were laminated so that the directions of the light scattering angle regions were orthogonal; Example 3 in which two light control layer (3) having the light scattering angle region with a range of 50° were laminated so that the light scattering angle regions were plane symmetry and parallel, and the light scattering angle regions were brought in contact and broadened; and Example 4 in which two light control layer (5) having the light scattering angle region with a range of 50° were laminated so that the light scattering angle regions were plane symmetry and parallel, and the light scattering angle regions were overlapped by 20° and broadened; remarkably improved brightness and resolution which were viewed from an oblique direction, in comparison with Comparative Example 2 which composed a screen by one light control layer and Comparative Example 3 in which two light control layer (7) having the narrow light scattering angle region with a range of 20° were laminated so that the directions of the light scattering angle regions were orthogonal, and in particular, the brightness and resolution which were viewed from the front are also improved in Example 4. Further, Example 5 in which the light control layer (3) was laminated on the light control layer (4) which broadened the light scattering angle region by the two layer so that the directions of the light scattering angle regions were orthogonal improves further the brightness and resolution to an oblique direction. Further, total light transmittance can be enhanced and the moiré can be suppressed by using the light control layer in comparison with Comparative Example 1 which is the combination of conventional lenticular lenses and Fresnel lenses.

What is claimed is:

1. A projection screen comprising a plural number of light control layers in which a haze value of each light control layer is dependent on an angle of incidence of light and a light scattering angle region of at least 30° showing the haze value of 60% or more when light is injected on the surface of the light control layer at an angle of from 0 to 180°.

2. The screen according to claim 1, wherein the light control layer was cured by irradiating light on a composition comprising at least two kinds of optically polymerizable monomers or oligomers which have different refractive indices.

3. The screen according to claim 1 or 2, wherein two light control layers of the plural number are laminated so that the directions of the light scattering angle regions are nearly orthogonal.

4. The screen according to claim 1 or 2, wherein two light control layers of the plural number are laminated so that the directions of the light scattering angle regions of the two layers are nearly parallel, the respective light scattering angle region is inclined from the each normal line, and the inclination direction of the light scattering angle regions is opposite with each other to the normal line.

5. The screen according to claim 4, wherein the light scattering angle regions of the two light control layers are mutually brought in contact.

6. The screen according to claim 4, wherein the portions of the light scattering angle regions of the two light control layers are overlapped.

7. The screen according to claim 4, further comprising at least one additional layer laminated so that the direction of the light scattering angle region is nearly orthogonal against the light scattering angel region of the two light control layers.

* * * * *